Jan. 3, 1961 M. J. BROWN 2,967,275

CLIPPER CIRCUIT FOR PULSE MODULATORS

Filed Dec. 11, 1958

INVENTOR
M. J. BROWN
BY R. P. Miller
ATTORNEY 2,967,275

CLIPPER CIRCUIT FOR PULSE MODULATORS

Martin J. Brown, Princeton, N.J., assignor to Western Electric Company, Incorporated, New York, N.Y., a corporation of New York Filed Dec. 11, 1958, Ser. No. 779,710

5 Claims. (Cl. 328—67)

Figure 1:
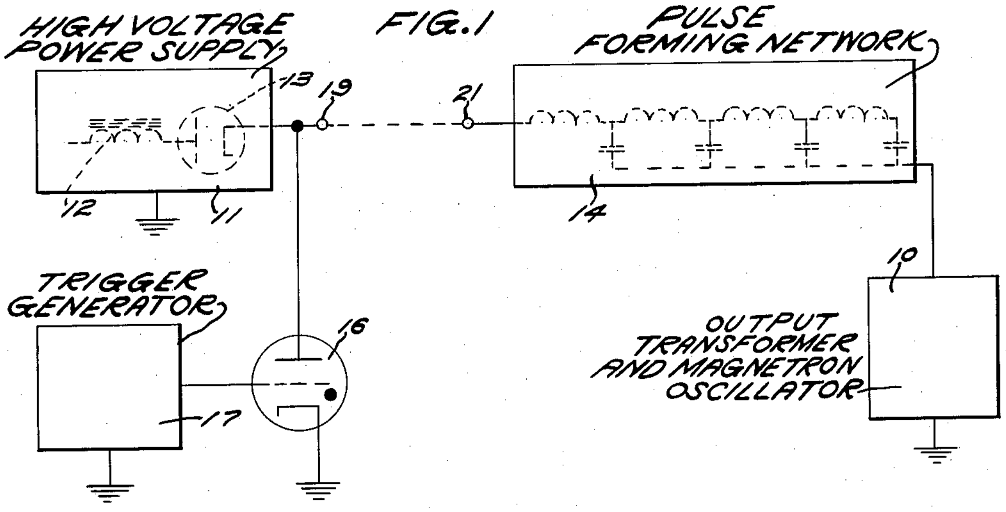

This invention is related to clipper circuits which may be used, for example, in magnetron type modulators for eliminating inverse voltage pulses produced by the modulator.

Modulators for radar or other high frequency equipment customarily utilize magnetron oscillators which are pulse modulated by high voltage, short duration pulses. The circuits which produce the high voltage, short duration pulses are commonly comprised of a high voltage D.C. power supply which charges or stores energy in a pulse forming network over a resonant reactive path. A thyratron connected to the pulse forming network is triggered when the charging current to the network has dropped to a value of zero to provide a low resistive path between the network and magnetron oscillator, thereby permitting the network to discharge quickly through the thyratron to deliver a high voltage pulse of short duration to the oscillator.

An inherent difficulty has been encountered with circuits of this type in that the pulse producing circuits possess oscillatory characteristics, and upon production of high voltage, short duration pulses, and inverse or reflected pulse is formed which places a reverse polarity upon the thyratron. The inverse pulse causes highly unstable operation of the thyratron and if large enough, may damage the thyratron to the extent of preventing operation of the pulse producing circuit altogether.

It is therefore an object of this invention to provide a new and improved clipper circuit.

Another object of the invention is to provide a clipper circuit for pulse modulators which will overcome detrimental effects of inverse or reflected pulses.

Another object of this invention is to provide a low resistive clipper circuit for pulse producing circuits which operates as a short circuit to ground only for short duration pulses of a predetermined polarity.

With these and other objects in view, the present invention contemplates a clipper or protection circuit for providing a low resistive path for only high voltage pulses of a short duration and of a predetermined polarity. The clipper circuit has particular utilization in pulse producing circuits used in conjunction with high frequency directional systems wherein the circuit comprises a thyratron tube having the control grid and cathode thereof connected across an inductance and the plate thereof connected to ground potential. The inductance is serially connected between a power supply and a storage or pulse forming network of the pulse producing circuit whereby pulses of only a predetermined polarity and having a high rate of current change with respect to time will develop a sufficient difference in potential of the correct polarity between the cathode and grid of the thyratron to place the tube in a conductive condition. It may therefore be understood, that upon the formation of a pulse of this type, the thyratron will provide a short circuit to ground for the pulses and eliminate the effect of the pulses within the pulse producing circuit.

Figure 2:
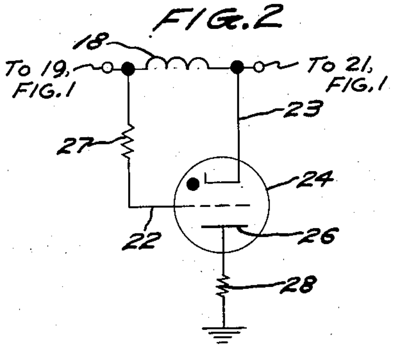
Figure 3:
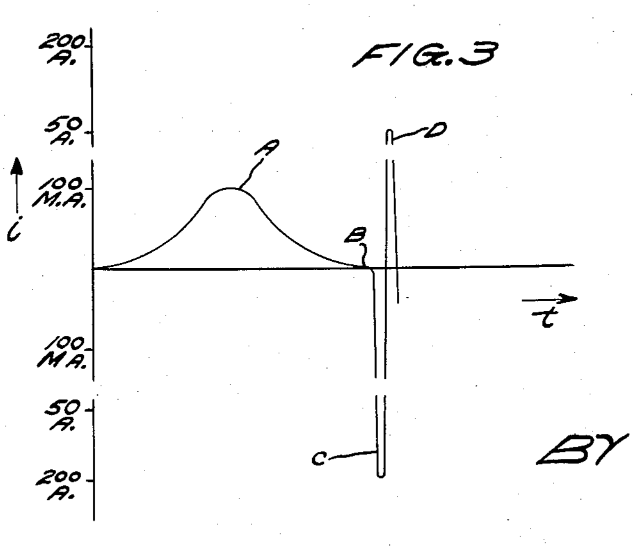

Other objects, advantages and novel aspects of the invention will become apparent upon consideration of the following detailed description in conjunction with the accompanying drawings wherein:

Fig. 1 discloses a typical pulse producing circuit for feeding high voltage, short duration pulses to a magnetron oscillator;

Fig. 2 discloses a clipper or a protection circuit that may be used with circuits of the type shown in Fig. 1 embodying the principles of the instant invention; and Fig. 3 is a graphic analysis of one cycle of the charging currents in the circuit of Fig. 1 showing the effects of the clipper circuit of Fig. 2.

Attention is now directed to Fig. 1 wherein is shown a typical or customary circuit used to supply high voltage, short duration pulses to an output transformer and magnetron oscillator 10. The pulse producing circuit comprises a high voltage D.C. power supply 11 having an output choke 12 and an output diode tube 13 which applies a D.C. voltage of approximately 10,000 volts to a pulse forming network 14. The pulse forming network may be any type of circuit wherein a high voltage is stored, such as, a plurality of inductance-capacitance networks. Connected between the power supply 11 and the network 14 is a thyratron tube 16 which is connected to the magnetron oscillator 10 through a ground connection. A trigger generator 17 is connected to the control grid of the thyratron 16 to render the thyratron conductive at a predetermined instant in the operation of the pulse producing circuit.

In operation of the pulse producing circuit, the power supply 11 applies a charging current to the pulse forming network 14. This charging current, because of the high reactive path introduced by the power supply, is of a low current value in the range of 100 milliamperes and has a low rate of change relative to time as disclosed by portion A of the charging current curve in Fig. 3. The power supply 11 continues to charge the network 14 until the network reaches the maximum voltage produced by the power supply. At this point, the charging current drops to zero as illustrated by point B in the charging current curve of Fig. 3. The charging of the pulse forming network 14 is so synchronized, by any suitable means (not shown), with the trigger generator 17 that the generator applies a pulse to the control grid of the thyratron 16 just after the charging current drops to zero and renders the thyratron highly conductive.

When the thyratron 16 is conductive, the tube presents a low resistive path for the charge stored in the network 14 and thereby allows a high voltage, short duration pulse to be applied to the oscillator 10. This pulse is of a high rate of current change with respect to time and reaches a peak current value of approximately 200 amperes and is shown as section C of the charging current curve. Because of the oscillatory characteristics of the pulse producing circuit, an inverse or reflected pulse is produced which has a polarity opposite to that of the original pulse C and is likewise of a high rate of change of current with respect to time which reaches a peak current value of approximately 50 amperes as disclosed by portion D of the charging curve.

If this inverse or reflected pulse D is allowed to reach the plate of the thyratron 16, thereby placing a reverse polarity on the thyratron, highly unstable operation or damage of the thyratron occurs. It therefore becomes necessary in the utilization of pulse producing circuits of the type shown in Fig. 1 to provide a means which will eliminate the detrimental effects of such an inverse or reflected pulse without effecting the charging of the pulse forming network or the discharging of the network through the thyratron 16. Such a circuit is disclosed in Fig. 2.

The clipper circuit shown in Fig. 2 comprises an inductance 18 which may be connected between terminals 19 and 21 in the pulse producing circuit of Fig. 1. Connected to either side of the inductance 18 are the control grid 22 and the cathode 23 of a second thyratron tube 24, the plate 26 of the thyratron being connected to ground potential. It will be noted that the control grid 22 of the thyratron 24 is connected to the high voltage power supply side of the inductance 18 and the cathode 23 is connected to the pulse forming network side of the inductance. A resistor 27 is connected between the inductance 18 and the control grid 22 of the thyratron 24 to limit the amount of current flowing through the control grid and a resistor 28 is connected between the plate 26 and ground potential to present a small resistance in the circuit through the thyraton 24.

As the thyratron 24 requires a potential difference of approximately 100 volts between the control grid 22 and the cathode 23 before the thyratron 24 is allowed to conduct, the charging current A for the pulse producing network 14 will not place a sufficient potential difference across the inductance 18 to cause the thyratron 24 to become conductive. This is because the voltage across the inductance is proportional to the rate of change of current with respect to time and as the charging current A has a low rate of change of current, only a small potential difference is placed across the inductance 18. Also, the thyratron 24 will not become conductive when the thyratron 16 conducts and the network 14 discharges to produce the pulse C shown in Fig. 3, even though a large potential difference will be placed across the inductance 18. The polarity of this potential will be such as to cause the cathode 23 to be positive with respect to the control grid 22.

However, upon the conduction of the inverse or reflected pulse D through the pulse producing circuit, the thyratron 24 will become conductive and short circuit the pulse D to ground and thereby prevent the high voltage, high current pulse D from being applied to the plate of thyratron 16. The thyratron 24 becomes conductive because the pulse D, being a high voltage pulse of a high rate of change of current with respect to time, places a substantial potential difference across the inductance 18 of a polarity to make the control grid 22 of the thyratron 24 positive with respect to the cathode 23. It may be understood therefore that the described clipper or protective circuit will only become operative upon the production of an inverse or reflected pulse to short circuit the pulse to ground and will not affect the operation of the charging pulse A or the discharging pulse C. It will be noted, however, that since the resistor 28 presents a small resistance in the circuit of thyratron 24, a portion of the inverse pulse D will be conducted to the thyratron 16. This portion of the pulse D may be controlled by the value of the resistor 28 to place that amount of potential on the plate of the thyratron 16 to cause the thyratron to deionize quickly without causing faulty operation of the tube, and thereby permitting the pulse producing circuit to operate at higher frequencies.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A clipper circuit for shorting to ground potential pulses transmitted through a high voltage line and which are of a short duration and predetermined polarity comprising, a reactive element connected in said high voltage line, an electron tube having a cathode, a control grid and a plate, said tube having characteristics requiring a substantial potential difference between the control grid and cathode for conduction, said control grid and cathode being connected on opposite sides of the reactive element whereby pulses of the predetermined polarity and high rates of change of current develop a sufficient potential drop across the reactive element to render the tube conductive, a first resistive element connected between the control grid and reactive element for limiting the grid current, said plate connected to ground potential, and a second resistive element connected between the plate and ground for partially absorbing pulses conducted therethrough.

2. A clipper circuit in combination with a pulse producing network for pulse modulating the output of an oscillator and having means for storing a high voltage D.C. potential, means for instantaneously providing a low resistive path for said D.C. potential to the oscillator whereby a high voltage short duration pulse of a first polarity is transmitted to the oscillator and a high voltage short duration pulse of a second polarity is formed thereafter, which comprises, a reactive means connected to said storing means, and means rendered operative by passage of pulses of said second polarity through the reactive means for completing a path to ground.

3. A clipper circuit in combination with a pulse producing circuit for pulse modulation systems having a pulse forming network for storing electrical energy, a high voltage D.C. power supply for feeding a charging current having a low rate of change with respect to time to said network, an output oscillator, a gate circuit connected between the power supply and network for providing a low resistive path to said oscillator upon the charging current dropping to zero whereby a first high voltage pulse of a high rate of change of current and a first polarity is transmitted to said oscillator and a second high voltage pulse of a high rate of change of current and of a second polarity is formed, which comprises, a reactive element connected between the gate circuit and the network for developing a substantial voltage drop thereacross upon the passage of said first and second pulses, and an electron tube having the control grid and cathode thereof connected to either side of the reactive element to render the tube conductive upon passage of the second pulses of said second polarity through the reactive element, said tube having the plate thereof connected to ground potential.

4. A clipper circuit in combination with a pulse producing circuit for pulse modulation systems having a pulse forming network for storing electrical energy, a high voltage D.C. power supply for feeding a current having a low rate of change with respect to time to said network, an output oscillator, a first thyratron tube connected between the network and oscillator, means for rendering said first thyratron conductive to provide a low resistive path whereby a high voltage short duration pulse is transmitted to the oscillator and a high voltage short duration reflected pulse is formed, which comprises, an inductance coil connected between said network and first thyratron for developing a substantial voltage drop thereacross upon passage of said pulse and reflected pulse through the inductance, a second thyratron tube having the control grid and cathode thereof connected to either side of the coil for becoming conductive upon passage of said reflected pulse through the coil, a first resistor connected between the coil and the control grid of the second thyratron for limiting the control grid current, said second thyratron having the plate thereof connected to ground potential for short circuiting the reflected pulse, and a second resistor connected between the plate and ground for absorbing the major portion of the energy of the reflected pulse and diverting a minor portion thereof to said first thyratron to cause the first thyratron to deionize quickly.

5. A clipper circuit for shorting to ground potential pulses transmitted through a high voltage line and which are of short duration and predetermined polarity comprising, a reactive element connected in said high voltage line, an electron tube having a cathode, a control grid and a plate, said tube having characteristics requiring a substantial difference between the control grid and cathode for conduction, said control grid and cathode being connected on opposite sides of the reactive element so that pulses of the predetermined polarity and high rates of change of current develop a sufficient potential drop across the reactive element to render the tube conductive to keep a low resistance current path to ground.

References Cited in the file of this patent

UNITED STATES PATENTS

| | | |
|---|---|---|
| 2,511,595 | Loughren | June 13, 1950 |
| 2,743,360 | Stanton et al. | Apr. 24, 1956 |
| 2,815,445 | Yucht | Dec. 3, 1957 |

OTHER REFERENCES

Gas Tubes Protect High Power Transmitters by Parker and Hoover, Electronics, Jan. 1956, pp. 144 to 147.